US010075078B2

(12) United States Patent
Li (10) Patent No.: US 10,075,078 B2
(45) Date of Patent: Sep. 11, 2018

(54) CONTROL CIRCUIT FOR MAINTAINING A SWITCHING FREQUENCY FOR CONSTANT ON TIME CONVERTER

(71) Applicant: Chengdu Monolithic Power Systems Co., Ltd., Chengdu (CN)

(72) Inventor: Yike Li, Chengdu (CN)

(73) Assignee: Chengdu Monolithic Power Systems Co., Ltd. (CN)

( * ) Notice: Subject to any disclaimer, the term of this patent is extended or adjusted under 35 U.S.C. 154(b) by 0 days.

(21) Appl. No.: 15/011,336

(22) Filed: Jan. 29, 2016

(65) Prior Publication Data

US 2016/0226382 A1 Aug. 4, 2016

(30) Foreign Application Priority Data

Feb. 2, 2015 (CN) .......................... 2015 1 0053080

(51) Int. Cl.
*H02M 3/158* (2006.01)
*H02M 3/156* (2006.01)
*H02M 1/00* (2006.01)

(52) U.S. Cl.
CPC ......... *H02M 3/1588* (2013.01); *H02M 3/158* (2013.01); *H02M 3/1563* (2013.01); *H02M 2001/0003* (2013.01)

(58) Field of Classification Search
CPC ....................................... H02M 3/156–3/1588
See application file for complete search history.

(56) References Cited

U.S. PATENT DOCUMENTS

| | | | | |
|---|---|---|---|---|
| 2006/0012351 | A1* | 1/2006 | Moussaoui | H02M 3/1584 323/271 |
| 2012/0274301 | A1* | 11/2012 | Nakashima | H02M 3/1588 323/284 |
| 2013/0063102 | A1* | 3/2013 | Chen | H02M 3/156 323/234 |
| 2014/0210534 | A1* | 7/2014 | Wang | H03K 7/08 327/175 |
| 2015/0180341 | A1* | 6/2015 | Yuan | H02M 3/156 323/271 |

* cited by examiner

*Primary Examiner* — Gary L Laxton
*Assistant Examiner* — Peter Novak
(74) *Attorney, Agent, or Firm* — Perkins Coie LLP (57) ABSTRACT

A control circuit for a switching power converter is disclosed. The control circuit may comprise an OFF control signal generation module configured to generate an OFF control signal having an inactive logic state and an active logic state. The control circuit is configured to turn OFF a main switch of the switching power converter in response to the active logic state. The OFF control signal generation module can regulate an ON time of the main switch through regulating a change of the OFF control signal from the inactive logic state to the active logic state based on a first capacitor voltage across a first capacitor to maintain a switching frequency of the main switch substantially constant. The first capacitor is charged in a predetermined time since the main switch is turned ON and discharged after the predetermined time.

12 Claims, 6 Drawing Sheets

CONTROL CIRCUIT FOR MAINTAINING A SWITCHING FREQUENCY FOR CONSTANT ON TIME CONVERTER

CROSS-REFERENCE TO RELATED APPLICATIONS

This application claims priority to and the benefit of Chinese Patent Application No. 201510053080.1, filed Feb. 2, 2015, which is incorporated herein by reference in its entirety.

FIELD OF THE INVENTION

This disclosure generally relates to electronic circuits, and particularly but not exclusively relates to control circuit for switching power converter.

BACKGROUND

DC-DC switching power converters are generally configured to provide regulated DC (direct current) output voltage or output current to load based on un-regulated DC source. For instance, in most automobile applications, un-regulated DC voltage of about 12 volts is provided as power source. DC-DC switching power converters may be applied to receive the un-regulated DC voltage of about 12 volts to provide regulated output voltage or output current to drive various electronic circuits (e.g. instrument panels, lighting devices, motor controllers, radio/audio devices etc.) in the automotive vehicles. The regulated output voltage can be lower, higher or equal to the un-regulated DC voltage.

Commonly used control methods for controlling switching power converters may include average current control method, peak current control method and constant on time (COT) control method etc. Average current control method and peak current control method permit accurate detection of the output voltage or output current of the switching power converters to provide feedback information indicative of the output voltage or output current to a control loop. However, the control loop generally requires complicated compensation circuits to maintain the stability and an appropriate band width of the control loop. Moreover, switching power converters that employ the average current control method and peak current control method may have bad load transient performance. Switching power converters employing the COT control method may not require the compensation circuits, which simplifies the design and reduces the cost, but the switching frequency of COT controlled switching power converters tends to change with the input voltage or load current of the switching power converters. For obtaining a stable switching frequency, usually a phase-locked loop module may need to be designed for COT controlled switching power converters. However, the phase-locked loop module requires a clock signal of higher frequency than the switching frequency and the phase-locked loop itself requires compensation, which is hard to design. Therefore, there exists a need to design a control circuit for the COT controlled switching power converters to maintain the switching frequency of the COT controlled switching power converters substantially constant.

SUMMARY

In accordance with an embodiment of the present invention, a control circuit for a switching power converter is provided. The control circuit may comprise: an ON control signal generation module, an OFF control signal generation module and a logic control module.

The ON control signal generation module may be configured to receive a reference signal and a feedback signal indicative of an output voltage or an output current of the switching power converter, and to compare the feedback signal with the reference signal to provide an ON control signal.

The OFF control signal generation module configured to generate an OFF control signal having an inactive logic state and an active logic state.

The logic control module may be configured to receive the ON control signal and the OFF control signal, and to provide a control signal based on the ON control signal and the OFF control signal to control an ON and OFF switching of a main switch in the switching power converter, wherein the control signal turn the main switch ON in response to the ON control signal and turn the main switch OFF in response to the active logic state of the OFF control signal.

The OFF control signal generation module in accordance with various embodiments of the present invention may be configured to charge a first capacitor in a predetermined time since the main switch is turned ON and to discharge the first capacitor after the predetermined time, and further configured to regulate an ON time of the main switch through regulating a change of the OFF control signal from the inactive logic state to the active logic state based on a first capacitor voltage across the first capacitor to maintain a switching frequency of the main switch substantially constant.

BRIEF DESCRIPTION OF THE DRAWINGS

The following detailed description of the embodiments of the present invention can best be understood when read in conjunction with the following drawings, in which the features are not necessarily drawn to scale but rather are drawn as to best illustrate the pertinent features.

The use of the same reference label in different drawings indicates the same or like components.

DETAILED DESCRIPTION

Various embodiments of the present invention will now be described. In the following description, some specific details, such as example circuits and example values for these circuit components, are included to provide a thorough understanding of embodiments of the technology. One skilled in the relevant art will recognize, however, that the invention can be practiced without one or more specific details, or with other methods, components, materials, etc. In other instances, well-known structures, materials, or operations are not shown or described in detail to avoid obscuring aspects of the invention.

Figure 1:
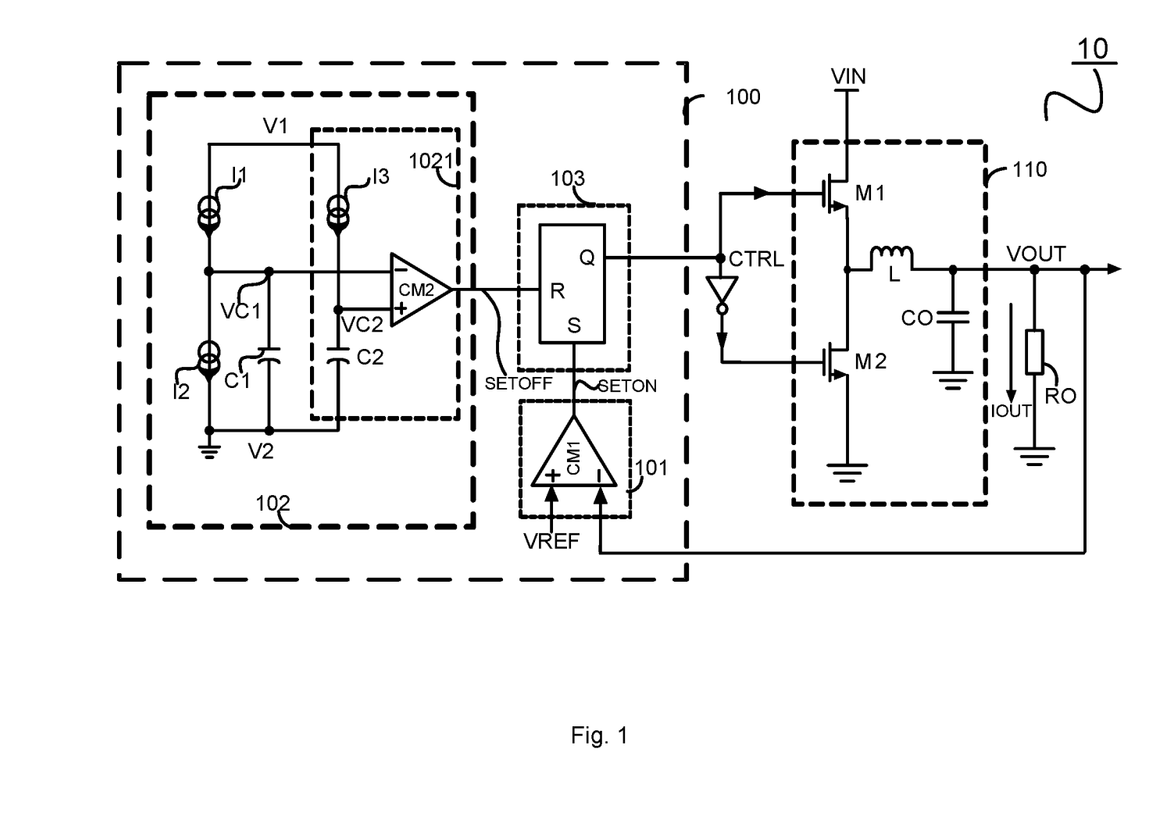
FIG. 1 illustrates a schematic diagram of a switching power converter 10 in accordance with an embodiment of the present invention.

FIG. 1 illustrates a schematic diagram of a switching power converter 10 in accordance with an embodiment of the present invention. The switching power converter 10 may comprise a control circuit 100 and a switching circuit 110.

The switching circuit 110 may comprise a main switch M1 and a second switch M2 coupled in series between an input port VIN of the switching power converter and a reference ground. The main switch M1 and the second switch M2 have a common connection. The switching circuit 110 is configured to receive a control signal CTRL and to switch on and off (e.g. through switching the main switch M1 and the second switch M2 on and off) based on the control signal CTRL to convert an input voltage (also labeled with VIN for simplicity) provided at the input port VIN to an output voltage VOUT at an output port (also labeled with VOUT for simplicity) of the switching power converter 10. An inductive power storage device L may be coupled between the common connection of the main switch M1 and the second switch M2 and a capacitive power storage device COUT may be coupled between the output port VOUT and the reference ground. In such an exemplary embodiment shown in FIG. 1, the switching power converter 10 is configured to have buck type topology. However, this is not intended to be limiting. In other embodiments, the switching power converter 10 may have other topology, for instance, boost type topology, fly-back type topology etc.

The control circuit 100 may comprise an ON control signal generation module 101, an OFF control signal generation module 102 and a logic control module 103.

The ON control signal generation module 101 may be configured to receive a reference signal VREF at a first input terminal, to receive the output voltage VOUT at a second input terminal, and to compare the output voltage VOUT with the reference signal VREF to provide an ON control signal SETON at an output terminal. In an alternative embodiment, instead of receiving the output voltage VOUT, the second input terminal may receive a feedback signal indicative of the output voltage VOUT or an output current IOUT (i.e. a load current) that the switching power converter 10 provides to a load. In this case, the ON control signal generation module 101 is configured to compare the feedback signal with the reference signal VREF to provide the ON control signal SETON. In an exemplary embodiment as shown in FIG. 1, the ON control signal generation module 101 may comprise a first comparator CM1 having a first comparator input terminal, a second comparator input terminal and a comparator output terminal respectively configured as the first input terminal, the second input terminal and the output terminal of the ON control signal generation module 101. The comparator CM1 is configured to compare the output voltage VOUT (or the voltage signal indicative of the output current IOUT) with the reference signal VREF to provide the ON control signal SETON.

The OFF control signal generation module 102 may comprise a first current source I1, a second current source I2, a first comparator C1 and a timing circuit 1021. The OFF control signal generation module 102 may be configured to provide an OFF control signal SETOFF. In an embodiment, the first current source I1 may have a first terminal and a second terminal, wherein the first terminal is coupled to a first supply terminal V1, and wherein the first current source is configured to provide a first current I1 during a predetermined time TSET at the second terminal. The first capacitor C1 may have a first terminal coupled to the second terminal of the first current source I1 and a second terminal coupled to a second supply terminal V2. The second current source I2 may have a first terminal coupled to the second terminal of the first current source I1 and a second terminal coupled to the second supply terminal V2. The timing circuit 1021 may have an input terminal and an output terminal, wherein the input terminal is coupled to the first terminal of the first capacitor C1, and wherein the timing circuit 1021 is configured to provide the OFF control signal SETOFF at the output terminal so as to regulate an on time TON of the main switch M1 based on a first capacitor voltage VC1 across the first capacitor C1, and thus, to maintain a switching frequency of the switching power converter 10 substantially constant. In an embodiment, at each switching cycle, the timing circuit 1021 is configured to start timing at the moment when the main switch M1 is turned ON, and is further configured to set the OFF control signal SETOFF to change from an inactive logic state to an active logic state after a first time TC1 is timed. When the OFF control signal SETOFF is at the active logic state, the control signal CTRL is configured to turn OFF the main switch M1. Therefore, the first time TC1 actually equals to the on time TON of the main switch M1. That is to say, the timing circuit 1021 can regulate the on time TON of the main switch M1 through regulating the first time TC1 so as to maintain the switching frequency of the switching power converter 10 substantially constant.

In accordance with an embodiment of the present invention, the timing circuit 1021 may comprise a third current source I3, a second capacitor C2 and a second comparator CM2. The third current source I3 may have a first terminal and a second terminal, wherein the first terminal is coupled to the first supply terminal V1. The second capacitor C2 may have a first terminal coupled to the second terminal of the third current source I3 and a second terminal coupled to the second supply terminal V2. The second comparator CM2 may have a first input terminal coupled to the first terminal of the first capacitor C1 (which is also configured as the input terminal of the timing circuit 1021), and a second input terminal coupled to the first terminal of the second capacitor C2, wherein the second comparator CM2 is configured to compare the first capacitor voltage VC1 with a second capacitor voltage VC2 across the second capacitor to provide the OFF control signal SETOFF at its output terminal.

The logic control module 103 may be configured to receive the ON control signal SETON and the OFF control signal SETOFF and to provide the control signal CTRL based on the ON control signal SETON and the OFF control signal SETOFF. In an embodiment, the logic control module 103 may comprise an RS flip-flop RS1 having a set input terminal S, a reset input terminal R and an output terminal Q, wherein the RS flip-flop RS1 is configured to receive the ON control signal SETON at the set input terminal S, to receive the OFF control signal SETOFF at the reset input terminal R, and to provide the control signal CTRL at the output terminal Q.

Figure 2:
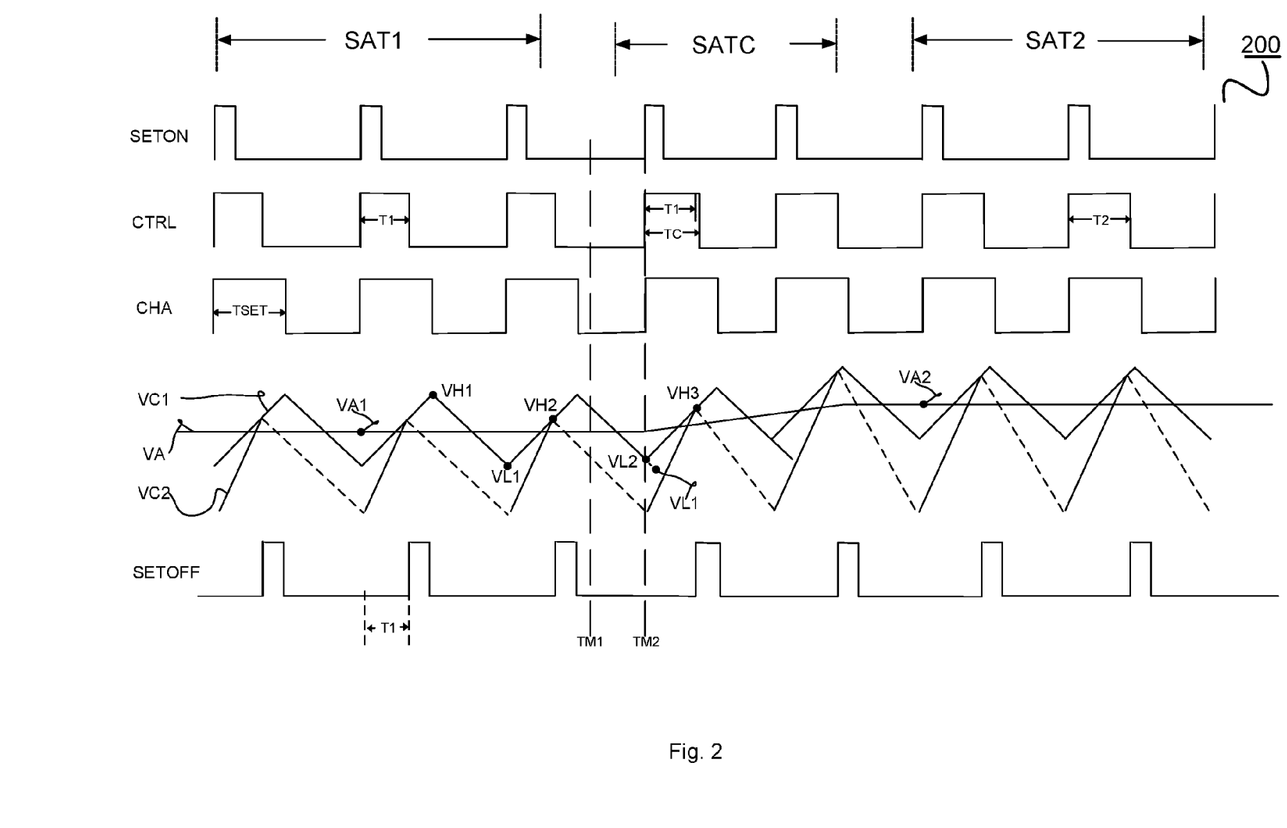
FIG. 2 illustrates a schematic waveform diagram 20 illustrating an operation process of the switching power converter 10.

FIG. 2 illustrates a schematic waveform diagram 20 illustrating an operation process of the switching power converter 10. The waveform diagram 20 may comprise three operation states, i.e. a first operation state SAT1 during which the switching power converter 10 is required to provide a first load current, a second operation state SAT2 during which the switching power converter 10 is required to provide a second load current and a transition operation state SATC between the first operation state SAT1 and the second operation state SAT2. At the first operation state SAT1, when the output voltage VOUT is lower than the reference signal VREF, the ON signal generation module 101 is configured to the regulate the ON control signal SETON to change from a low logic level to a high logic level, and the logic control module 103 is configured to regulate the control signal CTRL to change from a low logic level to a high logic level to turn ON the main switch M1. In an embodiment, assuming that the first current source I1 provides the first current to charge the first capacitor C1 once the main switch M1 is turned ON, thus the first capacitor voltage VC1 rises from a first low voltage VL1 to a first high voltage VH1 during the predetermined time TSET. After the predetermined time TSET elapses, the first current source I1 stops charging the first capacitor C1 while the second current source I2 starts to discharge the first capacitor C1 and thus the first capacitor voltage VC1 starts to decrease from the first high voltage VH1. In FIG. 2, the waveform labeled with CHA is illustrated to have a high logic level and a low logic level, wherein the high logic level of the waveform CHA indicates that the first current source I1 is charging the first capacitor C1, and wherein the low logic level of the waveform CHA indicates that the first current source I1 stops charging the first capacitor C1. When the main switch M1 is turned ON, the second capacitor voltage VC2 of the second capacitor C2 is rapidly discharged to ground potential (the rapid discharging circuit for the second capacitor C2 is not illustrated out for simplicity). After that, the third current source I3 starts to charge the second capacitor C2 until a first time T1 is timed and the second capacitor voltage VC2 is increased to reach the first capacitor voltage VC1 (e.g. at the voltage level VH2). Then the OFF control signal SETOFF provided at the output terminal of the second comparator CM2 changes from the inactive logic state to the active logic state to turn the main switch M1 OFF. The first time T1 is actually equal to the on time TON of the main switch M1.

During the first operation state SAT1, the electric charges provided by the first current source I1 to charge the first capacitor C1 and the electric charges discharged by the second current source I2 to the first capacitor C1 should be equal, which may be expressed by:

$$TP = I1 * TSET / I2 \quad (1)$$

In the above expression (1), TP represents a switching cycle (assuming that the second current source I2 discharges the first capacitor C1 during the whole switching cycle TP). During the first operation state SAT1, the first current provided by the first current source I1 is substantially constant so is the second current provided by the second current source I2, the predetermined time TSET is also constant, thus according to the expression (1), the switching cycle TP should also be constant.

In accordance with an exemplary embodiment of the present invention, assuming that at time TM1, the load current IOUT of the switching power converter 10 increases, leading to a decrease in the output voltage VOUT. For instance, at time TM2, the output voltage VOUT is decreased to be lower than the reference signal VREF. Thus, the ON signal generation module 101 regulates the ON control signal SETON to change from the low logic level to the high logic level and the logic control module 103 regulates the control signal CTRL to change from the low logic level to the high logic level to turn the main switch M1 ON. Once the main switch M1 is turned ON, the first current source I1 starts to charge the first capacitor C1. Since at time TM2, the first capacitor voltage VC1 was decreased to a second low voltage VL2 which is higher than the first low voltage VL1, once the main switch M1 is turned ON, the first capacitor voltage VC1 starts to rise from the second low voltage VL2. Due to the rising start of the first capacitor voltage VC1 is increased to the second low voltage VL2, it takes a time TC longer than the first time T1 for the second capacitor voltage VC2 to reach ("catch up with") the first capacitor voltage (e.g. at VH3). That is to say, the timing circuit 1021 increases the first time that should be timed to delay the moment of the OFF control signal SETOFF changing from the inactive logic state (i.e. the low logic level) to the active logic state (i.e. the high logic level). As a result, the on time TON of the main switch M1 is increased. After several switching cycles, an average voltage value VA of the first capacitor voltage VC1 is increased from a first average voltage value VA1 to a second average voltage value VA2. Accordingly, the on time TON of the main switch M1 is increased from the first time T1 to a second time T2. Meanwhile, the switching power converter 10 enters into the second operation state SAT2. During the second operation state SAT2, the charging and discharging of the first capacitor C1 by the first current source I1 and the second current source I2 should still satisfy the above expression (1). Since the first current I1 provided by the first current source I1, the second current I2 provided by the second current source I2 and the predetermined time TSET are substantially constant, the switching cycle TP should be constant according to expression (1). That is to say, the switching cycle TP is unchanged during the first operation state SAT1 and the second operation state SAT2. In FIG. 2, partial of the waveform illustrating the second capacitor voltage VC2 is drawn with dotted line to illustrate that practical changes in the second capacitor voltage VC2 may be different from those shown in FIG. 2, for example, the second capacitor voltage VC2 may be allowed to exceed the first capacitor voltage VC1 and be discharged rapidly to the ground potential once the main switch M1 is turned ON.

For conventional switching power converters using the COT control method, when the output current (i.e. load current provided to load) increases, due to changes in the ON resistance of the switching power converter, the switching cycle may decrease since the ON time of the main switch M1 is constant. In contrast, for the switching power converter 10, since the control circuit 100 can adaptively regulate the ON time TON of the main switch M1 to increase with the increase in the load current IOUT or to decrease with the decrease in the load current IOUT, the switching cycle TP of the switching power converter 10 can be maintained substantially constant. When the input voltage VIN decreases or the load current IOUT increases, the average voltage value VA of the first capacitor voltage VC1 increases, and the timing circuit 1021 increases the first time TC1 that should be timed according to the first capacitor voltage VC1 so as to increase the ON time TON of the main switch M1. When the input voltage VIN increases or the load current IOUT decreases, the average voltage value VA of the first capacitor voltage VC1 decreases, and the timing circuit 1021 decreases the first time TC1 that should be timed according to the first capacitor voltage VC1 so as to decrease the ON time TON of the main switch M1. In this way, the switching cycle TP may be regulated to maintain substantially constant.

Figure 3:
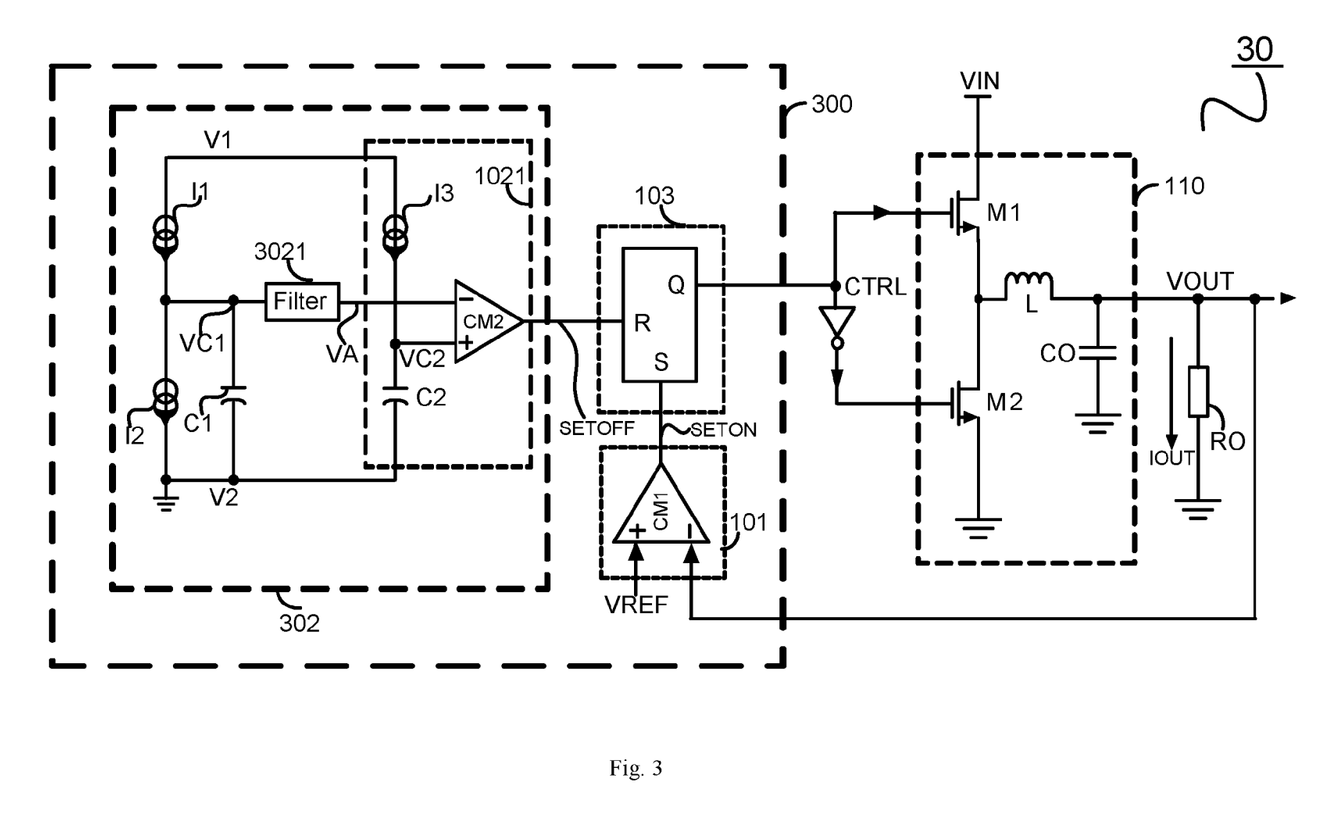
FIG. 3 illustrates a schematic diagram of a switching power converter 30 in accordance with an embodiment of the present invention.

FIG. 3 illustrates a schematic diagram of a switching power converter 30 in accordance with an embodiment of the present invention. The switching power converter 30 may comprise a control circuit 300 and a switching circuit 110. The control circuit 300 may comprise an ON control signal generation module 101, an OFF control signal generation module 302 and a logic control module 103. The use of the same reference labels in FIG. 3 indicates the same or like components or structures with substantially the same functions as in FIG. 1 for the sake of simplicity. Compared to the OFF control signal generation module 102, the OFF control signal generation module 302 may further comprise a filter circuit 3021. The filter circuit 3021 may have an input terminal coupled to the first terminal of the first capacitor C1 and an output terminal coupled to the input terminal of the timing circuit 1021 (i.e. the first input terminal of the second comparator CM2). The filter circuit 3021 is configured to provide an average voltage value VA of the first capacitor voltage VC1. Thus, with the filter circuit 3021, the timing circuit 1021 regulates the first time TC1 that should be timed based on the average voltage value VA of the first capacitor voltage VC1, which also means that the timing circuit 1021 regulates the ON time TON of the main switch M1 based on the average voltage value VA of the first capacitor voltage VC1 to maintain the switching cycle TP substantially constant. Thus, the switching frequency of the switching power converter 30 can be maintained substantially constant.

Figure 4:
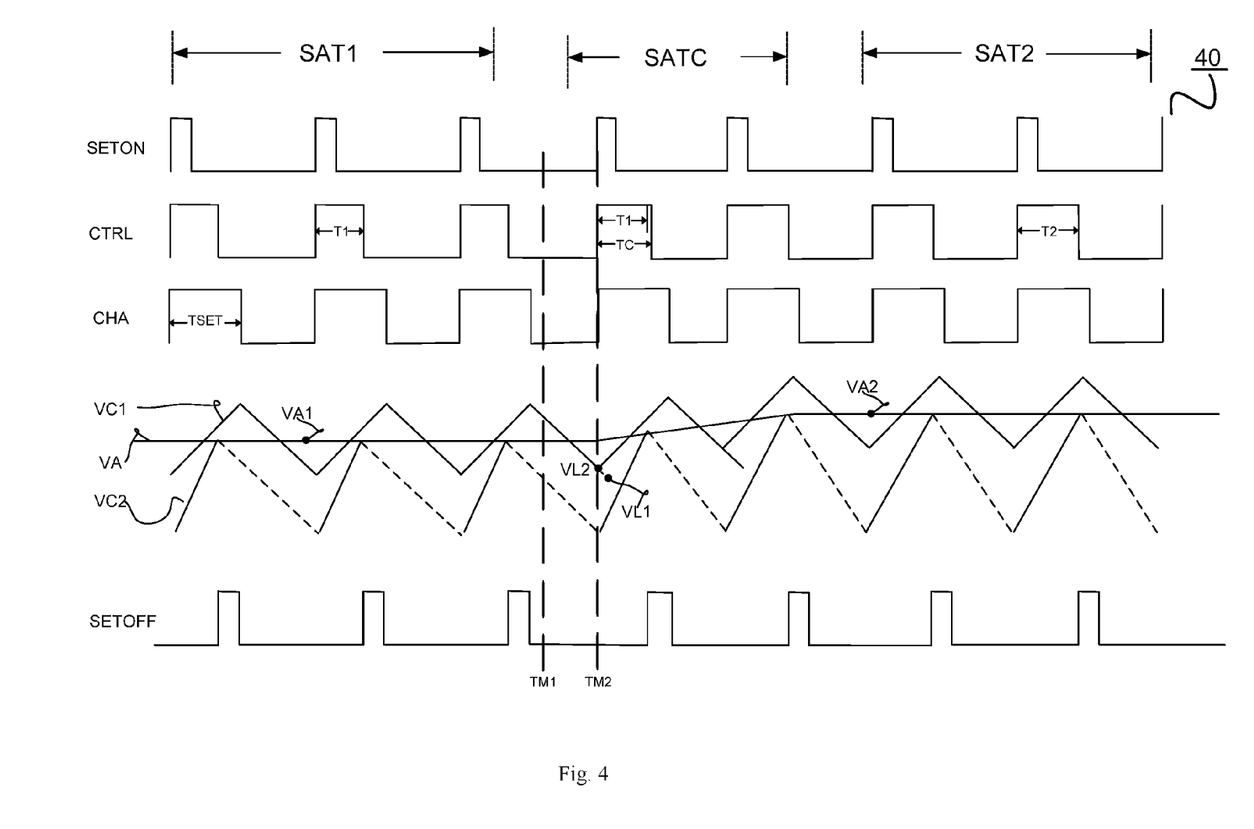
FIG. 4 illustrates a schematic waveform diagram 40 illustrating an operation process of the switching power converter 30.

FIG. 4 illustrates a schematic waveform diagram 40 illustrating an operation process of the switching power converter 30. Compared to the waveform diagram 20 shown in FIG. 2, in the waveform diagram 40, the second comparator CM2 changes the OFF control signal SETOFF from the inactive logic state to the active logic state when the second capacitor voltage VC2 reaches the average voltage value VA of the first capacitor voltage VC1.

The embodiments described above with reference to FIGS. 1-4 are not intended to be limiting, various modifications may be made. For instance, in the embodiments shown in FIGS. 1-4, the first current source I1 is configured to start charging the first capacitor C1 once the main switch M1 is turned ON. In other embodiments, the first current source I1 may be configured to start charging the first capacitor C1 after the main switch M1 is ON for an appropriate duration. The second current source I2 may be configured to discharge the first capacitor C1 during the entire switching cycle TP (in which case the second current I2 should be smaller than the first current I1), or alternatively may be configured to discharge the first capacitor C1 in a certain time of the switching cycle TP. For example, the second current source I2 may be configured to start discharging the first capacitor C1 after the first current source I1 stops charging the first capacitor C1.

In the embodiments shown in FIG. 1 and FIG. 3, the first current source I1 is configured to charge the first capacitor C1 with the first terminal of the first current source I1 coupled to a high voltage, and the second current source I2 is configured to discharge the first capacitor C1 with the second terminal of the second current source I2 coupled to a low voltage. One of ordinary skill in the art should understand that the second current source I2 may be configured to charge the first capacitor C1 with the first terminal of the second current source I2 coupled to a high voltage, while the first current source I1 may be configured to discharge the first capacitor C1 with the second terminal of the first current source I1 coupled to a low voltage. The timing circuit 1021 may alternatively be configured to regulate the first time TC1 that should be timed to change in reverse proportion to the first capacitor voltage VC1 or the average voltage value VA of the first capacitor voltage VC1. That is to say, the ON time TON of the main switch M1 may be regulated to decrease with the first capacitor voltage VC1 increasing and to increase with the first capacitor voltage VC1 decreasing. In an embodiment, when the input voltage VIN decreases or the load current IOUT decreases, the average voltage value VA of the first capacitor voltage VC1 decreases. Correspondingly, the timing circuit 1021 is configured to increase the ON time TON with the first capacitor voltage VC1 decreasing.

Figure 5:
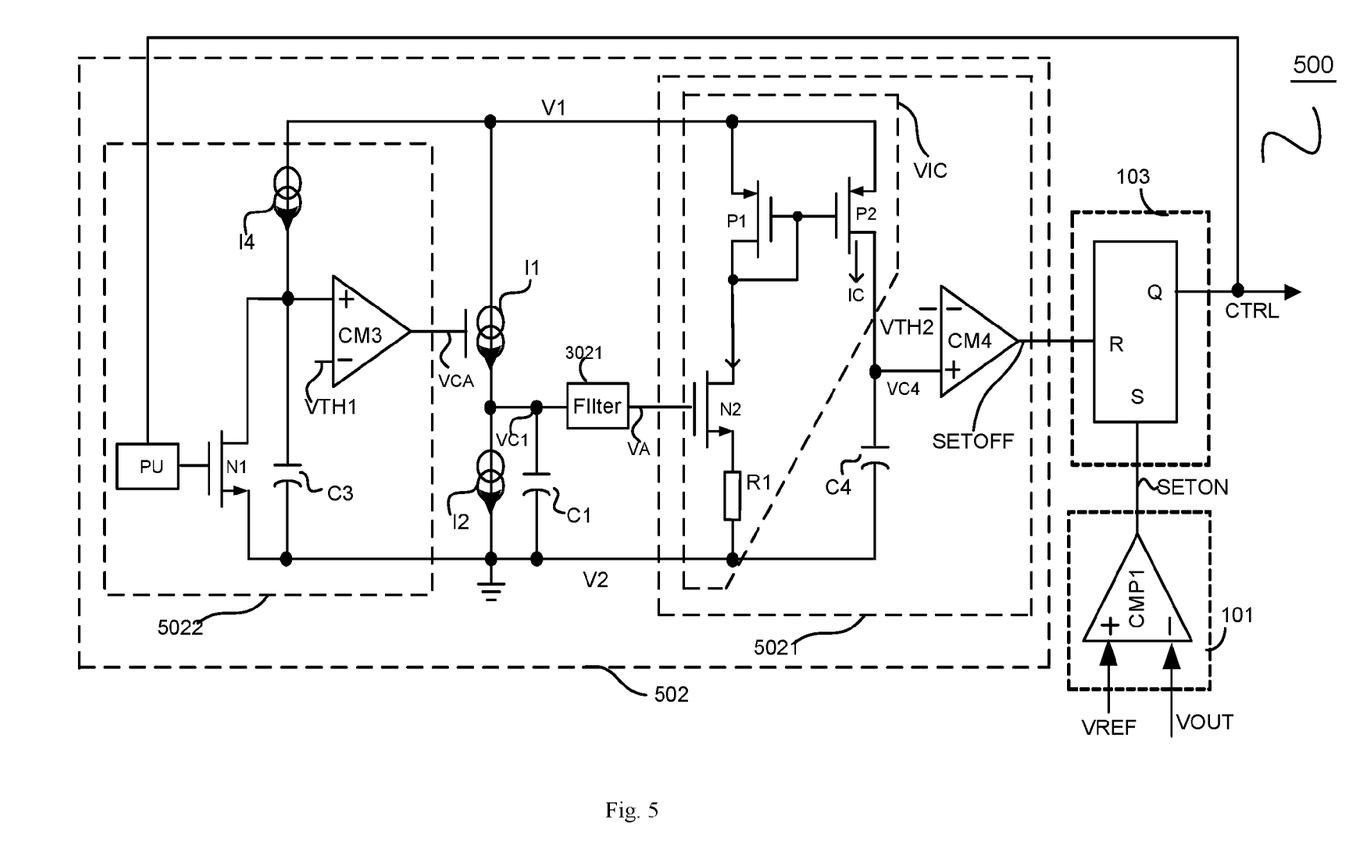
FIG. 5 illustrates a schematic diagram of a control circuit 500 for a switching power converter in accordance with an embodiment of the present invention.

FIG. 5 illustrates a schematic diagram of a control circuit 500 for a switching power converter (e.g. the switching power converter 10 or 30) in accordance with an embodiment of the present invention. The control circuit 500 may be configured to control the switching circuit 110 or other switching power converters. The control circuit 500 may comprise an ON control signal generation module 101, an OFF control signal generation module 502 and a logic control module 103. The use of the same reference labels in FIG. 5 indicates the same or like components or structures with substantially the same functions as in FIG. 1 and FIG. 2 for the sake of simplicity. Compared with the OFF control signal generation module 302 of FIG. 3, the OFF control signal generation module 502 comprises a timing circuit 5021 instead of the timing circuit 3021 and further comprises a second timing circuit 5022.

The timing circuit 5021 may comprise a voltage to current conversion circuit VIC, a first capacitor C4 and a fourth comparator CM4. The voltage to current conversion circuit VIC may have an input terminal configured as the input terminal of the timing circuit 5021 which may be coupled to receive the first capacitor voltage VC1 or the average voltage value VA of the first capacitor voltage VC1. The voltage to current conversion circuit VIC further has an output terminal and is configured to convert the average voltage value VA of the first capacitor voltage VC1 to a converted current signal IC, which is provided at the output terminal of the voltage to current conversion circuit VIC. The fourth capacitor C4 may have a first terminal coupled to the output terminal of the voltage to current conversion circuit VIC and a second terminal coupled to the second supply terminal V2. The fourth comparator CM4 may have a first input terminal configured to receive a second threshold VTH2, a second input terminal coupled to the first terminal of the fourth capacitor C4 to receive a fourth capacitor voltage VC4 across the fourth capacitor C4, and an output terminal configured to provide the OFF control signal SETOFF based on comparison of the fourth capacitor voltage VC4 with the second threshold VTH2.

In accordance with an exemplary embodiment of the present invention, the voltage to current conversion circuit VIC may comprise a first resistor R1, a first transistor N2, a second transistor P1 and a third transistor P2 connected as shown in FIG. 5.

Figure 6:
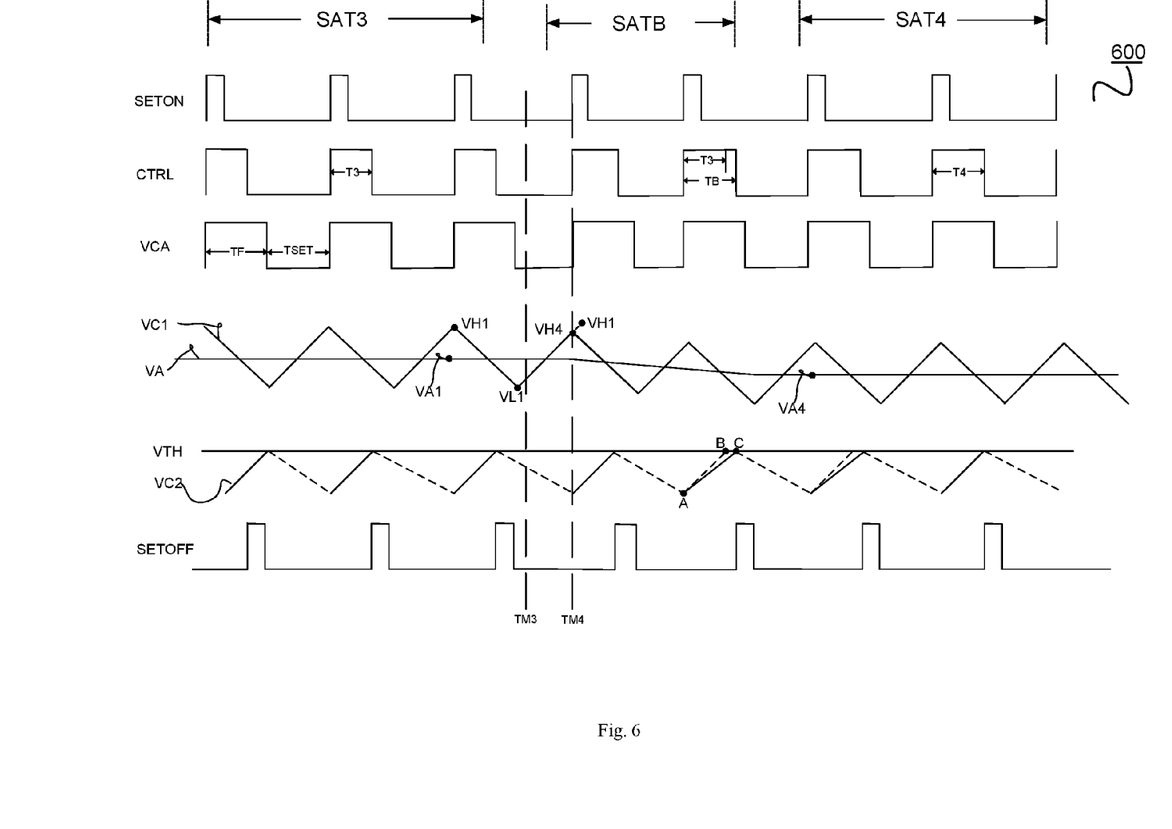
FIG. 6 illustrates a schematic waveform diagram 600 illustrating an operation process of the control circuit 500 when driving the switching circuit 110 to operate in accordance with an embodiment of the present invention.

The second timing circuit 5022 may have an input terminal configured as the input terminal of the OFF control signal generation module 502 to receive the control signal CTRL and an output terminal configured to provide a second timing signal VCA. The second timing circuit 5022 is configured to start timing at the moment when the main switch M1 is turned ON until a second time TF has been timed. The first current source I1 is configured to start charging the first capacitor C1 at the moment when the second timing circuit 5022 stops timing and to stop charging the first capacitor C1 when the main switch M1 is turned ON at a next switching cycle. That is to say, the predetermined time TSET begins at the moment when the second timing circuit stops timing (i.e. the second time TF has been timed)

and ends at the moment when the main switch is turned ON at a next switching cycle, illustrated out in FIG. 6 as the predetermined time TSET.

In accordance with an exemplary embodiment of the present invention, the second timing circuit 5022 may comprise a pulse generation circuit PU, a fourth current source I4, a third capacitor C3, a discharging circuit N1 and a third comparator CM3. The pulse generation circuit PU may have an input terminal configured as the input terminal of the second timing circuit 5022 to receive the control signal CTRL and an output terminal configured to provide a pulse signal. The pulse generation circuit PU is configured to generate a narrow pulse each time when the main switch M1 is turned ON. The fourth current source I4 may have a first terminal and a second terminal, wherein the first terminal is coupled to the first supply terminal V1. The third capacitor C3 may have a first terminal coupled to the second terminal of the fourth current source I4 and a second terminal coupled to the second supply terminal V2. The discharging circuit may have a first terminal, a second terminal and a control terminal, wherein the first terminal is coupled to the first terminal of the third capacitor C3, the second terminal is coupled to the second supply terminal V2, and the control terminal is coupled to the output terminal of the pulse generation circuit PU. The third comparator CM3 may have a first input terminal, a second input terminal and an output terminal, wherein the first input terminal is coupled to the first terminal of the third capacitor C3, the second input terminal is configured to receive a first threshold VTH1, the third comparator is configured to compare a third capacitor voltage across the third capacitor C3 with the first threshold VTH1 to provide the second timing signal VCA to control the first current source I1.

FIG. 6 illustrates a schematic waveform diagram 600 illustrating an operation process of the control circuit 500 when driving the switching circuit 110 to operate. The waveform diagram 600 may comprise three operation states, i.e. a third operation state SAT3 during which the switching power converter 10 is required to provide a third load current, a fourth operation state SAT4 during which the switching power converter 10 is required to provide a fourth load current and a transition operation state SATB between the third operation state SAT3 and the fourth operation state SAT4.

At the third operation state SAT3, when the output voltage VOUT is lower than the reference signal VREF, the ON signal generation module 101 is configured to the regulate the ON control signal SETON to change from a low logic level to a high logic level, and the logic control module 103 is configured to regulate the control signal CTRL to change from a low logic level to a high logic level to turn ON the main switch M1. In an embodiment, assuming that the second timing circuit 5022 starts to time at the moment when the main switch M1 is turned ON and need to have a time TF timed. During the time TF, the first current source I1 is configured not to charge the first capacitor C1. Thus, the first capacitor voltage VC1 starts to decrease from the first high voltage VH1. After the time TF has been timed, the first current source I1 is configured to provide the first current to charge the first capacitor C1. Thus the first capacitor voltage VC1 starts to rise from the first low voltage VL1. In FIG. 6, the waveform labeled with VCA is illustrated to have a high logic level and a low logic level, wherein duration of the high logic level of the waveform VCA indicates the time TF, and wherein a duration of the low logic level of the waveform VCA indicates the predetermined time TSET. When the main switch M1 is turned ON, the fourth capacitor voltage VC4 of the fourth capacitor C4 is rapidly discharged to ground potential (the rapid discharging circuit for the fourth capacitor C4 is not illustrated out for simplicity). After that, the voltage to current conversion circuit VIC starts to charge the fourth capacitor C4 until a third time T3 is timed and the fourth capacitor voltage VC4 is increased to reach the second threshold VTH2. Then the OFF control signal SETOFF provided at the output terminal of the fourth comparator CM4 changes from the inactive logic state to the active logic state to turn the main switch M1 OFF. The time T3 is actually equal to the on time TON of the main switch M1.

In accordance with an exemplary embodiment of the present invention, assuming that at time TM3, the load current IOUT of the switching power converter 10 increases, leading to a decrease in the output voltage VOUT. For instance, at time TM4, the output voltage VOUT is decreased to be lower than the reference signal VREF. Thus, the ON signal generation module 101 regulates the ON control signal SETON to change from the low logic level to the high logic level and the logic control module 103 regulates the control signal CTRL to change from the low logic level to the high logic level to turn the main switch M1 ON. Since at time TM4, the first capacitor voltage VC1 was increased to a second high voltage VH2 which is lower than the first high voltage VH1, the first capacitor voltage VC1 will start to decrease from the second high voltage VH2 after time TM2. Due to the decreasing start of the first capacitor voltage VC1 is lower and lower, the average voltage value VA of the first capacitor voltage VC1 is decreased lower and lower. Thus, the converted current signal IC generated by the voltage to current conversion circuit VIC also decreases. Accordingly, the rising slope of the second capacitor voltage VC2 may be decreased, from line AB (illustrated with dotted line) to line AC as illustrated in FIG. 6. In consequence, the ON time TON of the main switch M1 can be increased from T3 to TB. That is to say, the timing circuit 5021 actually increases the time that should be timed from T3 to TB to delay the moment of the OFF control signal SETOFF changing from the inactive logic state (i.e. the low logic level) to the active logic state (i.e. the high logic level). As a result, the on time TON of the main switch M1 is increased. After several switching cycles, the average voltage value VA of the first capacitor voltage VC1 is decreased from a first average voltage value VA1 to a lower fourth average voltage value VA4. Accordingly, the on time TON of the main switch M1 is increased from the third time T3 to a fourth time T4. Meanwhile, the switching power converter 10 enters into the fourth operation state SAT4. During the fourth operation state SAT4, the charging and discharging of the first capacitor C1 by the first current source I1 and the second current source I2 should still satisfy the above expression (1). Since the first current I1 provided by the first current source I1, the second current I2 provided by the second current source I2 and the predetermined time TSET are substantially constant, the switching cycle TP should be constant according to expression (1). That is to say, the switching cycle TP is unchanged during the third operation state SAT3 and the fourth operation state SAT4.

In accordance with the exemplary embodiments of FIG. 5 and FIG. 6, the control circuit 500 can adaptively regulate the ON time TON of the main switch M1 to increase with the increase in the load current IOUT or to decrease with the decrease in the load current IOUT, the switching cycle TP of the switching power converter 10 can be maintained substantially constant. When the input voltage VIN decreases or the load current IOUT increases, the average voltage value VA of the first capacitor voltage VC1 decreases, and the timing circuit 5021 increases the first time TC1 that should be timed according to the first capacitor voltage VC1 so as to increase the ON time TON of the main switch M1. When the input voltage VIN increases or the load current IOUT decreases, the average voltage value VA of the first capacitor voltage VC1 increases, and the timing circuit 5021 decreases the first time TC1 that should be timed according to the first capacitor voltage VC1 so as to decrease the ON time TON of the main switch M1. In this way, the switching cycle TP may be regulated to maintain substantially constant.

One of ordinary skill in the art should understand that the waveforms shown in FIG. 2, FIG. 4 and FIG. 6 are only illustrative and not intended to be limiting. Practical operation waveforms may not confined to those shown in FIG. 2, FIG. 4 and FIG. 6.

From the foregoing, it will be appreciated that specific embodiments of the invention have been described herein for purposes of illustration, but that various modifications may be made without deviating from the invention. Many of the elements of one embodiment may be combined with other embodiments in addition to or in lieu of the elements of the other embodiments. Accordingly, the invention is not limited except as by the appended claims.

What is claimed is:

1. A control circuit for a switching power converter, comprising:
    an ON control signal generation module configured to receive a reference signal at a first input terminal, to receive a feedback signal indicative of an output voltage or an output current of the switching power converter at a second input terminal, and to compare the feedback signal with the reference signal to provide an ON control signal at an output terminal;
    an OFF control signal generation module configured to generate an OFF control signal having an inactive logic state and an active logic state; and
    a logic control module configured to receive the ON control signal and the OFF control signal, and further configured to provide a switch control signal based on the ON control signal and the OFF control signal to control an ON and OFF switching of a main switch in the switching power converter, wherein the switch control signal turn the main switch ON in response to the ON control signal and turn the main switch OFF in response to the active logic state of the OFF control signal; and wherein
    the OFF control signal generation module is configured to charge a first capacitor in a predetermined constant time since the main switch is turned ON and to discharge the first capacitor after the predetermined constant time, and further configured to regulate an ON time of the main switch through regulating a change of the OFF control signal from the inactive logic state to the active logic state based on a first capacitor voltage across the first capacitor to maintain a switching frequency of the main switch substantially constant when an input voltage or the output current of the power converter is changed.

2. The control circuit of claim 1, wherein the ON control signal generation module comprises a first comparator having a first comparator input terminal, a second comparator input terminal and a comparator output terminal respectively configured as the first input terminal, the second input terminal and the output terminal of the ON control signal generation module.

3. The control circuit of claim 1, wherein the OFF control signal generation module comprises:
    the first capacitor having a first terminal and a second terminal;
    a first current source having a first terminal coupled to a first supply terminal and a second terminal coupled to the first terminal of the first capacitor, wherein the first current source is configured to provide a first current in the predetermined time since the main switch is turned ON;
    a second current source having a first terminal coupled to the second terminal of the first current source and a second terminal coupled to a second supply terminal, wherein the second current source is configured to provide a second current; and
    a first timing circuit having an input terminal coupled to the first terminal of the first capacitor and an output terminal configured to provide the OFF control signal, wherein the first timing circuit is configured to regulate the ON time of the main switch based on the first capacitor voltage to maintain the switching frequency of the main switch substantially constant.

4. The control circuit of claim 3, wherein the first timing circuit is configured to start timing based on the first capacitor voltage once the main switch is turned ON until a first time has been timed, and wherein the first timing circuit is further configured to change the OFF control signal from the inactive logic state to the active logic state once the first time has been timed, and wherein the ON time of the main switch is actually equal to the first time.

5. The control circuit of claim 3, wherein the first current source is configured to charge the first capacitor during the predetermined time, and wherein the second current source is configured to discharge the first capacitor, and wherein the first timing circuit is configured to regulate the ON time of the main switch to be directly proportional to the first capacitor voltage or to an average voltage value of the first capacitor voltage.

6. The control circuit of claim 3, wherein the first current source is configured to discharge the first capacitor during the predetermined constant time, and wherein the second current source is configured to charge the first capacitor, and wherein the first timing circuit is configured to regulate the ON time of the main switch to be reversely proportional to the first capacitor voltage or to an average voltage value of the first capacitor voltage.

7. The control circuit of claim 3, wherein the first timing circuit comprises:
    a third current source having a first terminal and a second terminal, wherein the first terminal of the third current source is coupled to the first supply terminal;
    a second capacitor having a first terminal coupled to the second terminal of the third current source and a second terminal coupled to the second supply terminal; and
    a second comparator having a first input terminal configured as the input terminal of the first timing circuit and a second input terminal coupled to the first terminal of the second capacitor, wherein the second comparator is configured to compare a first voltage at the first input terminal with a second voltage at the second input terminal to provide the OFF control signal at an output terminal.

8. The control circuit of claim 3, wherein the OFF control signal generation module further comprises:
    a filter circuit having an input terminal coupled to the first terminal of the first capacitor and an output terminal coupled to the input terminal of the first timing circuit.

9. The control circuit of claim 3, wherein the OFF control signal generation module further comprises:
a second timing circuit having an input terminal configured as an input terminal of the OFF control signal generation module to receive the switch control signal and an output terminal configured to provide a second timing signal to control the first current source, wherein the second timing circuit is configured to start timing since the main switch is turned ON until a second time has been timed, and wherein the second timing signal is configured to regulate the first current source so that the predetermined time begins at the moment when the second timing circuit stops timing and ends at the moment when the main switch is turned ON at a next switching cycle.

10. The control circuit of claim 9, wherein the second timing circuit comprises:
a pulse generation circuit having an input terminal configure as the input terminal of the second timing circuit to receive the switch control signal and an output terminal configured to provide a pulse signal;
a fourth current source having a first terminal and a second terminal, wherein the first terminal of the fourth current source is coupled to the first supply terminal;
a third capacitor having a first terminal and a second terminal, wherein the first terminal of the third capacitor is coupled to the second terminal of the fourth current source, and the second terminal of the third capacitor is coupled to the second supply terminal;
a discharging circuit having a first terminal, a second terminal and a control terminal, wherein the first terminal of the discharging circuit is coupled to the first terminal of the third capacitor, the second terminal of the discharging circuit is coupled to the second supply terminal, and the control terminal of the discharging circuit is coupled to the output terminal of the pulse generation circuit; and a third comparator having a first input terminal, a second input terminal and an output terminal, wherein the first input terminal of the third comparator is coupled to the first terminal of the third capacitor, the second input terminal of the third comparator is configured to receive a first threshold, and the third comparator is configured to compare a third capacitor voltage across the third capacitor with the first threshold to provide the second timing signal.

11. The control circuit of claim 3, wherein the first timing circuit comprises:
a voltage to current conversion circuit having an input terminal and an output terminal, wherein the input terminal of the voltage to current conversion circuit is configured as the input terminal of the first timing circuit, and wherein the voltage to current conversion circuit is configured to convert a voltage at the input terminal to a converted current signal provided at the output terminal of the voltage to current conversion circuit;
a fourth capacitor having a first terminal coupled to the output terminal of the voltage to current conversion circuit, and a second terminal coupled to the second supply terminal;
a fourth comparator having a first input terminal configured to receive a second threshold, a second input terminal coupled to the first terminal of the fourth capacitor to receive a fourth capacitor voltage across the fourth capacitor, and an output terminal configured to provide the OFF control signal based on comparison of the fourth capacitor voltage with the second threshold.

12. The control circuit of claim 11, wherein the OFF control signal generation module further comprises:
a filter circuit having an input terminal coupled to the first terminal of the first capacitor and an output terminal coupled to the input terminal of the first timing circuit.

* * * * *